US008594614B2

(12) United States Patent
Eitel et al.

(10) Patent No.: US 8,594,614 B2
(45) Date of Patent: Nov. 26, 2013

(54) HANDLING EMERGENCY CALLS ON AN ELECTRONIC DEVICE

(75) Inventors: Robert T. Eitel, Bartlett, IL (US); Michael Charles Hollatz, Huntley, IL (US); Steven Vick, Aurora, IL (US); Jean-Philippe Paul Cormier, Ottawa (CA)

(73) Assignee: BlackBerry Limited, Waterloo (CA)

( * ) Notice: Subject to any disclaimer, the term of this patent is extended or adjusted under 35 U.S.C. 154(b) by 158 days.

(21) Appl. No.: 12/984,226

(22) Filed: Jan. 4, 2011

(65) Prior Publication Data
US 2012/0171983 A1 Jul. 5, 2012

(51) Int. Cl.
*H04M 11/04* (2006.01)
(52) U.S. Cl.
USPC .................. 455/404.1; 455/404.2; 455/521; 455/90.1
(58) Field of Classification Search
USPC ............................. 455/404.1, 404.2, 521, 90.1
See application file for complete search history.

(56) References Cited

U.S. PATENT DOCUMENTS

| 4,400,584 | A | * | 8/1983 | Vilmur ........................ 455/79 |
| 4,760,593 | A | * | 7/1988 | Shapiro et al. .................. 379/38 |
| 4,788,712 | A | * | 11/1988 | Umemoto et al. ............ 455/462 |
| 4,945,570 | A | * | 7/1990 | Gerson et al. ................. 455/563 |
| 5,210,785 | A | * | 5/1993 | Sato et al. .................. 455/552.1 |
| 5,305,370 | A | * | 4/1994 | Kearns et al. ................... 379/45 |
| 5,712,911 | A | * | 1/1998 | Her ......................... 379/388.01 |
| 5,896,567 | A | * | 4/1999 | Ogushi .......................... 455/421 |
| 6,611,596 | B1 | * | 8/2003 | Cannon et al. ........... 379/420.01 |
| 7,016,478 | B2 | | 3/2006 | Potorny et al. |
| 7,411,493 | B2 | | 8/2008 | Smith |
| 7,496,350 | B2 | | 2/2009 | Hiltunen |
| 2002/0132647 | A1 | * | 9/2002 | Chia et al. ....................... 455/570 |
| 2004/0091085 | A1 | | 5/2004 | Suganuma et al. |
| 2007/0049287 | A1 | * | 3/2007 | Dunn ......................... 455/456.1 |

(Continued)

FOREIGN PATENT DOCUMENTS

| WO | 2008148213 A1 | 12/2008 | |
| WO | WO 2008/148213 | * 12/2008 | ............... H04Q 7/38 |
| WO | WO 2008148213 A1 | * 12/2008 | ............... H04W 4/22 |

OTHER PUBLICATIONS

NENA Silent of Hang-up 9-1-1 Calls for Service; An Operations-Focused Study Operational Information Document 56-501; Aug. 23, 2002; Prepared by: National Emergency Number Association E/9-1-1 Wireline and Wireless Hang-up Subcommittee, 23 pages.*

(Continued)

*Primary Examiner* — Lester Kincaid
*Assistant Examiner* — Mehmood B Khan
(74) *Attorney, Agent, or Firm* — Novak Druce Connolly Bove + Quigg LLP

(57) ABSTRACT

There are disclosed techniques for handling emergency calls in an electronic device, such as a mobile telephone. For example, in one embodiment, upon receipt of a request at the user-interface of the device to terminate an emergency call, the device first requests confirmation that the call should be terminated. In another embodiment, once the emergency call is terminated, if an incoming call request is subsequently received within a predetermined period of time, the device establishes a voice connection with the incoming caller regardless of whether the device is instructed to establish the voice connection. In another embodiment, once the emergency call is terminated, the device remains operable to receive a subsequent incoming call regardless of whether the device is instructed otherwise.

22 Claims, 9 Drawing Sheets

(56) References Cited

U.S. PATENT DOCUMENTS

| | | |
|---|---|---|
| 2008/0214142 A1 | 9/2008 | Morin et al. |
| 2008/0305763 A1* | 12/2008 | Wijayanathan et al. ... 455/404.2 |
| 2009/0002145 A1 | 1/2009 | Berry et al. |
| 2009/0149153 A1* | 6/2009 | Lee ............................ 455/404.1 |
| 2009/0163196 A1 | 6/2009 | Van Steenbergen |
| 2009/0214000 A1 | 8/2009 | Patel et al. |
| 2009/0280770 A1 | 11/2009 | Mahendran |
| 2009/0285369 A1 | 11/2009 | Kandala |
| 2009/0291663 A1 | 11/2009 | Schultz et al. |
| 2010/0004950 A1 | 1/2010 | Bajko et al. |
| 2010/0027766 A1 | 2/2010 | Shin |
| 2010/0048159 A1 | 2/2010 | Stenquist |
| 2010/0054444 A1* | 3/2010 | Brunson ................. 379/211.02 |
| 2010/0056099 A1 | 3/2010 | Kazmi |
| 2010/0115609 A1 | 5/2010 | Spence |
| 2010/0190479 A1 | 7/2010 | Scott et al. |
| 2010/0222028 A1 | 9/2010 | Gisby et al. |
| 2010/0227582 A1 | 9/2010 | Berry et al. |
| 2012/0077471 A1* | 3/2012 | Hayashi et al. ............ 455/414.1 |
| 2012/0178408 A1* | 7/2012 | Wijayanathan et al. ... 455/404.1 |
| 2012/0289184 A1* | 11/2012 | Wijayanathan et al. ... 455/404.1 |
| 2013/0006479 A1* | 1/2013 | Anderson ....................... 701/49 |

OTHER PUBLICATIONS

European Search Report from corresponding EP Application No. EP 11 15 0133 issued on Sep. 19, 2011. 10 pages.

Partial European Search Report from corresponding EP Application EP 11 15 0133 issued on Jun. 16, 2011.

E911 (short for Enhanced 911), http://www.webopedia.com/TERM/E/E911.html. Retrieved on Sep. 27, 2010. One page.

3GPP Specification detail TS 24.008 Mobile radio interface Layer 3 specification; Core network protocols; Stage 3, http://www.3gpp.org/ftp/Specs/html-info/24008.htm. Retrieved on Nov. 29, 2010. Three pages.

\* cited by examiner

HANDLING EMERGENCY CALLS ON AN ELECTRONIC DEVICE

FIELD

The following relates to emergency calls on an electronic device, such as a mobile telephone.

BACKGROUND

When a user dials an emergency number, such as "911", "112", or "999", from his or her mobile device, a special control message is transmitted from the mobile device to the cellular network indicating an emergency call. The cellular network routes the call to an emergency call center, usually called the Public Safety Answering Point (PSAP), and a voice connection is established between the PSAP and the caller. Typically, known procedures are used to provide location information to the PSAP and to mitigate the risk of the call being dropped by the cellular carrier.

BRIEF DESCRIPTION

Embodiments of the present application will be described, by way of example only, with reference to the accompanying figures wherein.

Like reference numerals are used in different figures to denote similar elements.

DETAILED DESCRIPTION

Figure 1:
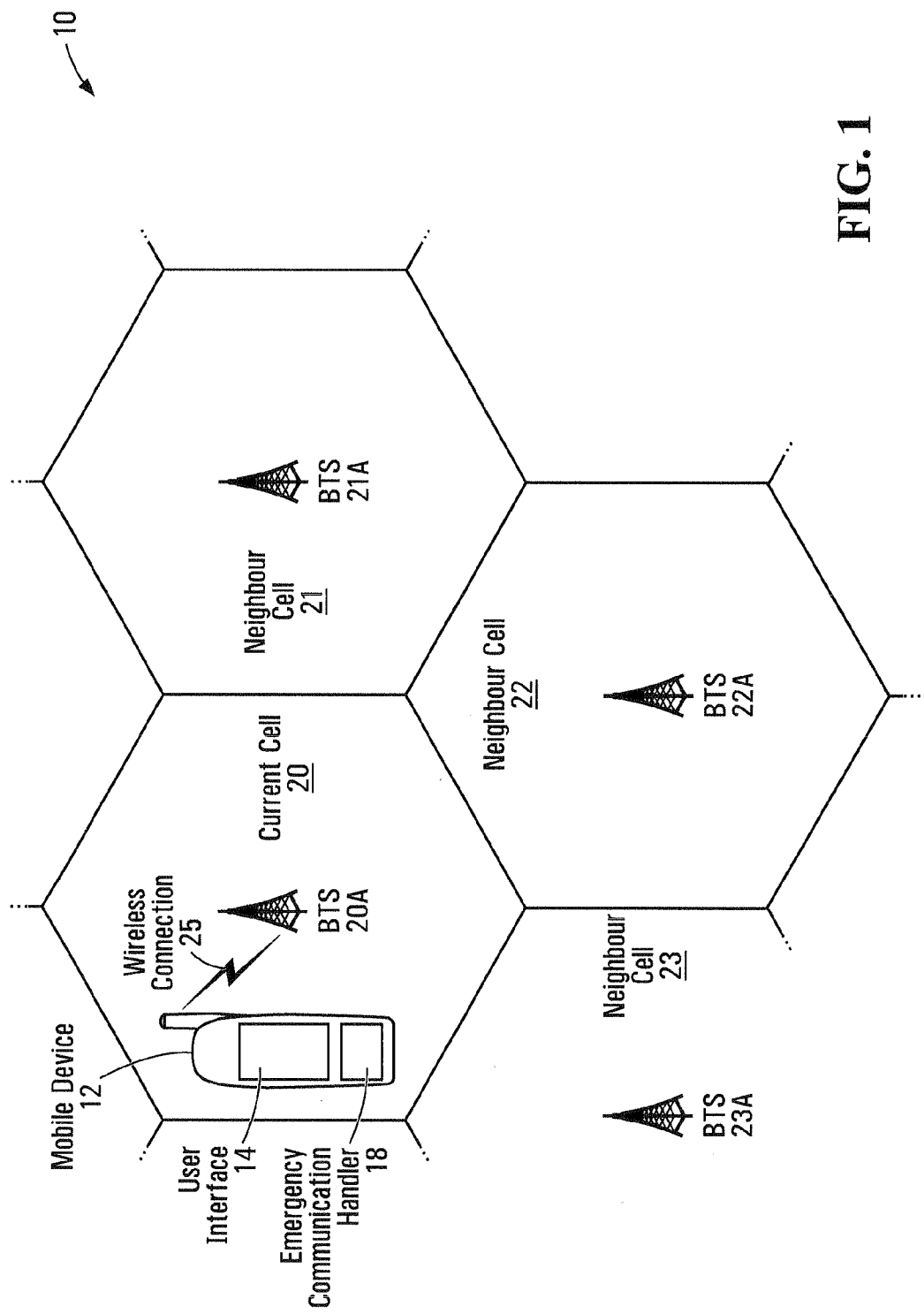
FIG. 1 is a block diagram of cells in a cellular network.

In general, there are disclosed methods for handling emergency calls in an electronic device. For example, in one embodiment, upon receipt of a request at the user-interface of the device to terminate an emergency call, the electronic device first requests confirmation that the call should be terminated. In another embodiment, once the emergency call is terminated, if an incoming call request is subsequently received within a predetermined period of time, the device establishes a voice connection with the incoming caller regardless of whether the device is instructed to establish the voice connection. In another embodiment, once the emergency call is terminated, the device remains operable to receive a subsequent incoming call regardless of whether the device is instructed otherwise.

It will be appreciated that, as used herein, an "emergency call" is a call that is designated as such by a user of the electronic device, for example, through dialing a particular number (e.g. "911") or through selecting a particular shortcut key or icon on the user-interface. Typically, such a call is with an emergency operator, such as a PSAP, or with a related authority. Whether there is an actual "emergency" is immaterial.

In one aspect, there is provided a method for handling a call in an electronic device comprising:

upon receipt of a request at a user-interface of the electronic device to terminate the call:

if the call is an emergency call, the electronic device requesting confirmation that the call should be terminated.

In one embodiment, the method further comprises, if the call is an emergency call, the electronic device delaying termination of the call, and wherein requesting confirmation that the call should be terminated comprises providing a message to the user-interface, the message requesting confirmation that the call should be terminated.

In another embodiment, the method further comprises, if the call is an emergency call, the electronic device delaying termination of the call until another message is received by the electronic device indicating that the call is terminated by a recipient of the call.

In yet another embodiment, the another message is a "Disconnect" message received on a signaling channel.

In still another embodiment, the message requesting confirmation that the call should be terminated comprises a message querying whether the call was made inadvertently.

In another embodiment, the method further comprises: receiving at the user-interface an indication that the emergency call was made inadvertently and in response the electronic device performing one of: (i) automatically generating a message for notifying a recipient of the call that the call was made inadvertently; and (ii) providing a message to the user-interface comprising instructions that instruct a user to communicate with a recipient of the call to specify that the call was made inadvertently.

In yet another embodiment, the method further comprises: if the call is an emergency call, the electronic device terminating the call only in response to a predetermined trigger.

In still another embodiment, the predetermined trigger is one of: (i) receipt of a further indication at the user-interface confirming the call should be terminated; (ii) a predetermined period of time having elapsed after receiving the request to terminate the call; and (iii) receipt of a message by the electronic device indicating the call is terminated by a recipient of the call.

In another embodiment, if the call is an emergency call, upon the call being terminated, the method further comprises: if an incoming call request is subsequently received by the electronic device within a predetermined period of time, establishing a voice connection regardless of whether an input is received at the user-interface instructing the electronic device to establish the voice connection.

In yet another embodiment, if the call is an emergency call, upon the call being terminated, the method further comprises: the electronic device remaining operable to receive a subsequent incoming call regardless of whether an input is received at the user-interface instructing otherwise.

In another aspect, there is provided an electronic device for handling a call, the device comprising:

a user-interface;

an emergency communication handler for, if the call is an emergency call, upon receipt of a request at the user-interface to terminate the call, requesting confirmation that the call should be terminated.

In one embodiment, the emergency communication handler is further configured for, if the call is an emergency call, delaying termination of the call; and wherein requesting confirmation that the call should be terminated comprises providing a message to the user-interface, the message requesting confirmation that the call should be terminated.

In another embodiment, the emergency communication handler is further configured for, if the call is an emergency call, delaying termination of the call until another message is received by the electronic device indicating that the call is terminated by a recipient of the call.

In yet another embodiment, upon receiving at the user-interface an indication that the emergency call was made inadvertently, the emergency communication handler is further configured to perform one of: (i) automatically generating a message for notifying a recipient of the call that the call was made inadvertently; and (ii) providing a message to the user-interface comprising instructions that instruct a user to communicate with a recipient of the call to specify that the call was made inadvertently.

In still another embodiment, the emergency communication handler is further configured for, if the call is an emergency call, terminating the call only in response to a predetermined trigger.

In another embodiment, if the call is an emergency call, upon the call being terminated, the emergency communication handler is further configured for:

if an incoming call request is subsequently received by the electronic device within a predetermined period of time, establishing a voice connection regardless of whether an input is received at the user-interface instructing the electronic device to establish the voice connection.

In yet another embodiment, if the call is an emergency call, upon the call being terminated, the emergency communication handler is further configured for: controlling the electronic device to remain operable to receive a subsequent incoming call regardless of whether an input is received at the user-interface instructing otherwise.

In still another embodiment, the electronic device is one of: (i) a mobile telephone; (ii) a desktop telephone; and (iii) a home telephone.

In another aspect, there is provided a method for handling a call in an electronic device comprising:

if the call is an emergency call:

upon the call being terminated, if an incoming call request is subsequently received by the electronic device within a predetermined period of time, establishing a voice connection regardless of whether an input is received at a user-interface of the electronic device instructing the electronic device to establish the voice connection.

In one embodiment, establishing the voice connection comprises activating speakerphone.

In another embodiment, establishing the voice connection comprises receiving a setup message from a network and in response transmitting a connect message to the network regardless of whether an input is received at the user-interface instructing the electronic device to transmit the connect message.

In yet another embodiment, the incoming call request comprises a setup message from the network, the setup message including an identifier identifying the call as originating from a Public Safety Answering Point (PSAP).

In still another embodiment, the method further comprises the electronic device using the identifier as a trigger to perform said establishing the voice connection regardless of whether the input is received at the user-interface of the electronic device instructing the electronic device to establish the voice connection.

In another embodiment, the method further comprises the electronic device only performing said establishing the voice connection regardless of whether the input is received at the user-interface of the electronic device instructing the electronic device to establish the voice connection if the setup message includes the identifier.

In yet another embodiment, the method further comprises, upon receiving the setup message including the identifier, providing an indication at the user-interface that the incoming call is an emergency.

In still another embodiment, if the call is an emergency call, the method further comprises the electronic device requesting confirmation that the call should be terminated.

In another embodiment, if the call is an emergency call, upon the call being terminated, the method further comprises: the electronic device remaining operable to receive the incoming call regardless of whether an input is received at the user-interface instructing otherwise.

In another aspect, there is provided an electronic device for handling a call, the device comprising:

a user-interface;

an emergency communication handler for, if the call is an emergency call:

upon the call being terminated, if an incoming call request is subsequently received by the electronic device within a predetermined period of time, establishing a voice connection regardless of whether an input is received at the user-interface instructing the electronic device to establish the voice connection.

In one embodiment, the user-interface includes a speakerphone, and establishing the voice connection comprises activating the speakerphone.

In another embodiment, establishing the voice connection comprises receiving a setup message from a network and in response transmitting a connect message to the network regardless of whether an input is received at the user-interface instructing the electronic device to transmit the connect message.

In yet another embodiment, the incoming call request comprises a setup message from the network, the setup message including an identifier identifying the call as originating from a Public Safety Answering Point (PSAP).

In still another embodiment, the emergency communication handler is further configured for using the identifier as a trigger to perform said establishing the voice connection regardless of whether the input is received at the user-interface instructing the electronic device to establish the voice connection.

In another embodiment, the emergency communication handler is further configured for only performing said establishing the voice connection regardless of whether the input is received at the user-interface of the electronic device instructing the electronic device to establish the voice connection if the setup message includes said identifier.

In yet another embodiment, upon receiving the setup message including the identifier, the emergency communication handler is further configured for providing an indication at the user-interface that the incoming call is an emergency.

In still another embodiment, if the call is an emergency call, the emergency communication handler is further configured for requesting confirmation that the call should be terminated.

In another embodiment, if the call is an emergency call, upon the call being terminated, the emergency communication handler is further configured for controlling the electronic device to remain operable to receive a subsequent incoming call regardless of whether an input is received at the user-interface instructing otherwise.

In yet another embodiment, the electronic device is one of: (i) a mobile telephone; (ii) a desktop telephone; and (iii) a home telephone.

In another aspect, there is provided a method for handling a call in an electronic device comprising:
if the call is an emergency call:
upon the call being terminated, the electronic device remaining operable to receive a subsequent incoming call regardless of whether an input is received at a user-interface of the electronic device instructing otherwise.

In one embodiment, remaining operable to receive the subsequent incoming call comprises the electronic device remaining operable for a predetermined period of time subsequent to the incoming call being terminated.

In another embodiment, remaining operable to receive the subsequent incoming call comprises maintaining a wireless access radio in a powered-on state.

In yet another embodiment, if the call is an emergency call, the method further comprises the electronic device requesting confirmation that the call should be terminated.

In still another embodiment, if the call is an emergency call, upon the call being terminated, the method further comprises: if a request for the subsequent incoming call is received by the electronic device, establishing a voice connection regardless of whether an input is received at the user-interface instructing the electronic device to establish the voice connection.

In another aspect, there is provide an electronic device for handling a call, the device comprising:
a user-interface;
an emergency call handler for, if the call is an emergency call:
upon the call being terminated, instructing the electronic device to remain operable to receive a subsequent incoming call regardless of whether an input is received at the user-interface instructing otherwise.

In one embodiment, remaining operable to receive the subsequent incoming call comprises remaining operable for a predetermined period of time subsequent to the incoming call being terminated.

In another embodiment, the electronic device further comprises a wireless access radio, and said remaining operable to receive the subsequent incoming call comprises maintaining the wireless access radio in a powered-on state.

In yet another embodiment, if the call is an emergency call, the emergency communication handler is further configured for requesting confirmation that the call should be terminated.

In still another embodiment, if the call is an emergency call, upon the call being terminated, the emergency communication handler is further configured for: if a request for the subsequent incoming call is received by the electronic device, establishing a voice connection regardless of whether an input is received at the user-interface instructing the electronic device to establish the voice connection.

In another embodiment, the electronic device is one of: (i) a mobile telephone; (ii) a desktop telephone; and (iii) a home telephone.

For illustrative purposes, embodiments will now be explained in greater detail below in conjunction with the figures.

The embodiments set forth below represent the necessary information to enable those skilled in the art to practice the claimed subject matter and illustrate the best mode of practicing such subject matter. Upon reading the following description in light of the accompanying figures, those skilled in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to computer readable storage medium or media for storage of information, such as computer readable instructions, data structures, program modules, or other data. A non-exhaustive list of examples of computer readable storage media include magnetic cassettes, magnetic tape, magnetic disk storage or other magnetic storage devices, optical disks such as CD-ROM, digital versatile disks (DVD) or other optical storage, volatile and non-volatile, removable and non-removable media implemented in any method or technology, RAM, ROM, EEPROM, flash memory or other memory technology. Any such computer storage media may be part of the device or accessible or connectable thereto. Any application or module herein described may be implemented using computer readable/executable instructions that may be stored or otherwise held by such computer readable storage media.

Occasionally, a user of a mobile device may accidentally make an emergency call, particularly when using a mobile device that does not require the device to be unlocked in order for the emergency call to be established. In such a situation, the user may hang-up as soon as he or she realizes the call was made, without speaking to the PSAP to let them know the call was inadvertent and that there is no emergency. In such a scenario, it is standard procedure for the PSAP to call back the mobile device in order to assess whether there is an emergency. However, if the user does not answer when the PSAP calls back (for example, because the user is no longer in the vicinity of the mobile device, or the user does not hear the mobile device or is engaged and is ignoring the mobile device), then the PSAP cannot verify whether or not there is an emergency. Often, the PSAP will dispatch the police to investigate, which is a waste of resources if there is no emergency.

Alternatively, in a real emergency situation, the user of the mobile device may be panicking or not thinking clearly and inadvertently or prematurely hang up on the PSAP before the PSAP has an opportunity to collect the required or desired information. If the PSAP attempts to call back, the user may not hear the mobile or ignore the mobile while attending to the emergency situation, or the user may have turned off the mobile device.

Situations such as those described above can also occur when using a conventional telephone, such as a desktop telephone at work or a land-line telephone at home.

In view of some of the situations discussed above, embodiments are described below.

Referring first to FIG. 1, an embodiment is described in which a mobile device 12 is located in a cellular network 10. The cellular network 10 comprises a plurality of cells 20, 21, 22, and 23. Each cell is served by a respective base transceiver station (BTS) 20A, 21A, 22A, and 23A. In FIG. 1, the mobile device 12 is located in the cell 20 and communicates with the BTS 20A via a wireless connection 25. As the mobile device 12 moves from the current cell 20 to a neighbouring cell (e.g. cell 23), a handoff method is performed to allow the mobile device 12 to seamlessly switch from communicating with the BTS 20A to the BTS of the neighbouring cell (e.g. BTS 23A). The mobile device 12 includes a user-interface 14 and an Emergency Communication Handler 18. Examples of these and possible other components of a mobile device, such as mobile device 12, will be described in greater detail below.

Figure 2:
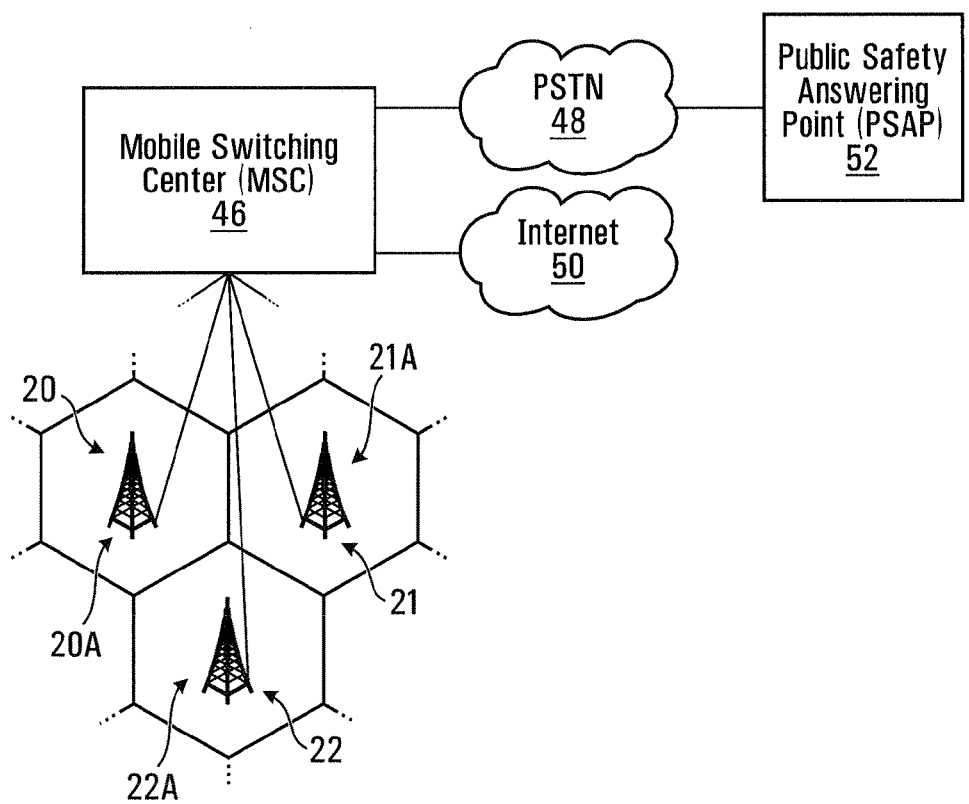
FIG. 2 is a block diagram of a network connecting a mobile device to a PSAP.

As shown in FIG. 2, each BTS in FIG. 1 is coupled to a Mobile Switching Center (MSC) 46, perhaps through a Base Station Controller (BSC) (not shown). The MSC 46 connects to the landline public switched telephone network (PSTN) 48 and the Internet 50. The PSTN 48 is connected to a local Public Safety Answering Point (PSAP) 52, which receives and processes emergency communications.

The descriptions of FIGS. 1 and 2 can be viewed as snapshots in time of the environment in which the mobile device 12 operates. Due to the mobility of the mobile device 12, this environment may change, and the mobile device 12 may move to be within the coverage area of a different set of cells (not shown). The mobile device 12 may move to be within a coverage area of a set of cells (not shown) that are configured to interact with a different PSAP than the PSAP 52 shown in FIG. 2.

During operation, if a request is received at the mobile device 12 to initiate an emergency communication, a special control message is transmitted from the mobile device 12 to the serving BTS (e.g. BTS 20A). The serving BTS informs the MSC (e.g. MSC 46), and the call is routed through the PSTN (e.g. PSTN 48) to the PSAP (e.g. PSAP 52). A voice connection is established between the PSAP and the mobile device 12.

Figure 3:
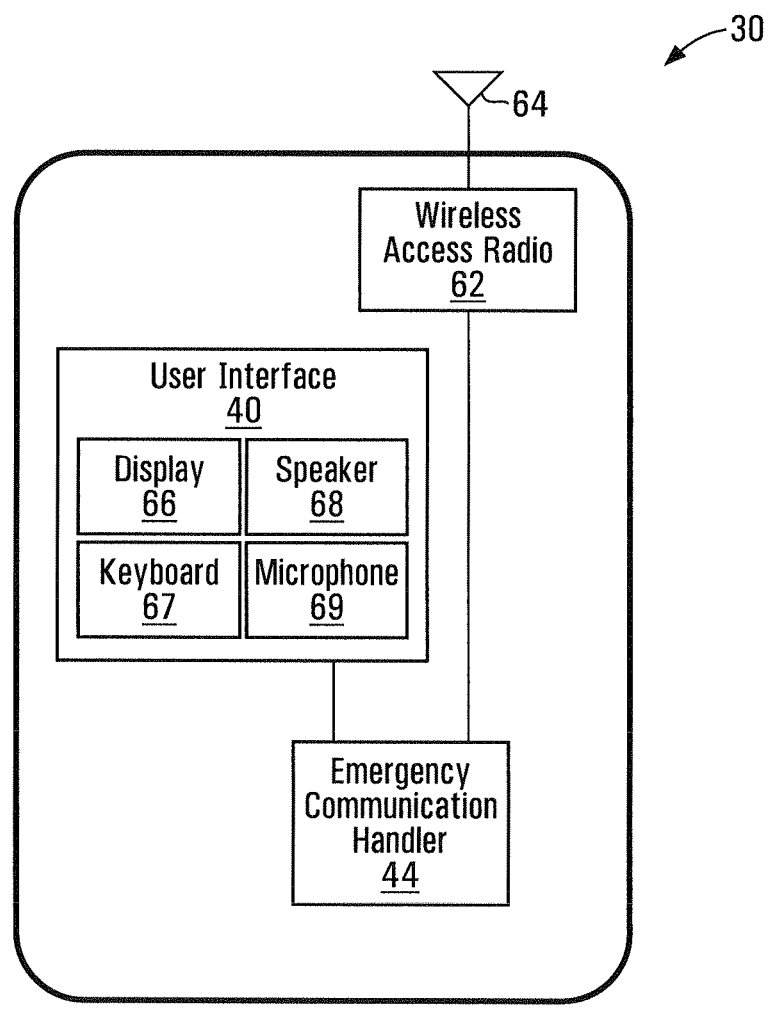
FIG. 3 is an embodiment of a mobile device that can be used to implement embodiments of the present application.

FIG. 3 shows in greater detail an embodiment of a mobile device 30. It will be appreciated that not all the components illustrated and described in the mobile device 30 are required in order to perform the methods described below. It will also be appreciated that other components of the mobile device 30 may also be present, but have been omitted for the sake of clarity. The mobile device 30 is a specific example of the mobile device 12 of FIG. 1, and the methods described below with reference to the mobile device 30 in FIG. 3 can also be applied to mobile device 12.

The embodiment of the mobile device 30 illustrated in FIG. 3 includes a wireless access radio 62 and at least one antenna 64 for communicating with the network via a BTS, such as BTS 20A.

The mobile device 30 in the embodiment in FIG. 3 further includes a user-interface 40. The user-interface 40 is an interface that enables interaction between the user and the mobile device 30. For example, the user-interface can include a display 66 (touch screen or not), a keyboard 67, a speaker 68, and/or a microphone 69 for receiving voice commands. All of these components are shown in the mobile device 30 of FIG. 3, although it will be appreciated that these are only specific examples, and not all may be present.

The mobile device 30 also includes an Emergency Communication Handler 44. The functionality of the Emergency Communication Handler 44 will become clear as explained in relation to the embodiments described below. For example, in one embodiment, upon receipt of a request at the user-interface 40 to terminate an emergency call, the Emergency Communication Handler 44 controls the mobile device 30 to provide a message to the user-interface 40 confirming the call should be terminated. In another embodiment, the Emergency Communication Handler 44 delays terminating the call, for example, by controlling the mobile device 30 to delay transmitting a "Disconnect" message to the network. In another embodiment, upon the emergency call being terminated, if an incoming call is subsequently received by the mobile device 30, the Emergency Communication Handler 44 automatically establishes a voice connection regardless of whether an input is received at the user-interface 40 instructing the mobile device 30 to establish the voice connection. In yet another embodiment, upon the emergency call being terminated, the Emergency Communication Handler 44 instructs the mobile device 30 to remain operable to receive a subsequent incoming call regardless of whether an input is received at the user-interface 40 instructing otherwise.

The Emergency Communication Handler 44 can be, for example, functionality implemented in one or more of hardware, firmware, or software in combination with a processor to run the software. For example the Emergency Communication Handler 44 may be a module or application comprising instructions stored on hardware, firmware, or any other computer-readable medium that, when executed by a processing unit (not shown), perform the functions of the Emergency Communication Handler 44 described herein.

It will be appreciated that not all of the components described in FIG. 3 are required to implement some of the embodiments described below, and that other components typically included in a mobile device have been purposely omitted for clarity.

Figure 4:
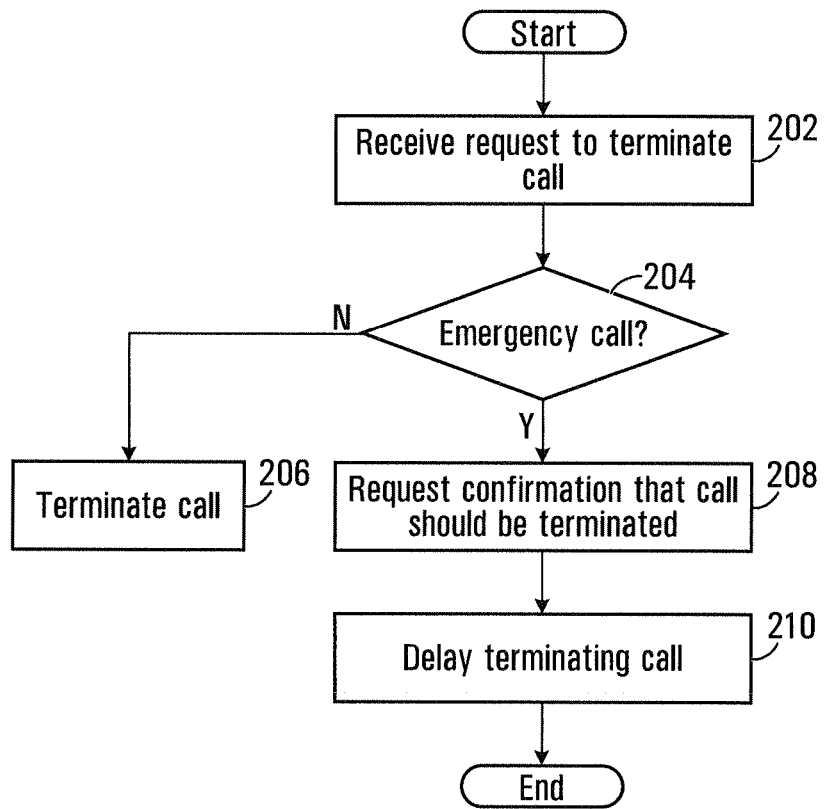
FIG. 4 is a flow diagram of one method for handling a call.

With reference to FIG. 4, one method is provided for handling an emergency call. The method of FIG. 4 is described with reference to the mobile device 30 shown in FIG. 3, but it will be appreciated that the method is not limited to such a device, and in fact, as explained later, is also applicable to electronic devices that are not mobile.

First in block 202, the mobile device 30 receives a request at its user-interface 40 to terminate an established call (i.e. an established voice connection). For example, the user may press an "end" button on keyboard 67. Next in block 204, the mobile device 30 determines whether the call is an emergency call. If the call is not an emergency call, the method proceeds to block 206 in which the call is terminated. If the call is an emergency call, in block 208, the mobile device 30 requests confirmation that the call should be terminated. For example, in one embodiment, a message is provided at the user-interface 40 requesting such confirmation. In block 210, the termination of the call is delayed.

Therefore, for example, if a user of the mobile device 30 inadvertently instructs the mobile device 30 to establish an emergency call, and upon realizing this, the user instructs the mobile device 30 to hang-up (i.e. to terminate the call), the mobile device 30 will request confirmation that the call should be terminated. In some embodiments, this confirmation can comprise a message provided to the user-interface 40 querying whether the call was made inadvertently. If the user indicates via the user-interface 40 (e.g. via keyboard 67) that the call was indeed made inadvertently, the mobile device 30 can take a number of actions, including, for example: (i) instructing the user (via a message at the user-interface 40) to communicate with the PSAP 52 to let the PSAP operator know that the call was made inadvertently, and then continuing to delay termination of the call; or (ii) automatically generating and transmitting a message via wireless access radio 62 to the PSAP 52 which notifies the PSAP 52 that the call was made inadvertently, and terminating the call. As an example, the message transmitted to the PSAP 52 could be embedded in a "Disconnect" message sent to the network on a signaling channel. In such an embodiment, when the mobile device 30 transmits the "Disconnect" message to initiate termination of the call, the "Disconnect" message will include an indicator indicating that the call was made inadvertently. The network extracts this indicator and forwards it to the PSAP 52. In another embodiment, the mobile device 30 transmits the indicator separately prior to transmitting the "Disconnect" message.

In other embodiments, in block 210, the mobile device 30 delays terminating the call until one or more predetermined triggers are received. A non-exhaustive list of predetermined triggers include: (i) receipt of a further indication at the user-interface 40 confirming the emergency call should be terminated; (ii) a predetermined period of time having elapsed after receiving the request to terminate the call in block 202; and (iii) receipt of a message by the mobile device 30 indicating that the call is terminated by the recipient of the call (e.g. by the PSAP 52). For example, the message could be a "Disconnect" message received from the network.

The Emergency Communication Handler 44 is configured to control the operations described above. For example, it is the Emergency Communication Handler 44 that controls the mobile device 30 to request confirmation that the emergency call should be terminated. As another example, it is the Emergency Communication Handler 44 that delays terminating the emergency call until a predetermined trigger is received.

Another method is described with reference to FIG. 5. As with the methods described above, the method described below will be described with reference to the mobile device 30 shown in FIG. 3, but it will be appreciated that the method is not limited to such devices.

Figure 5:
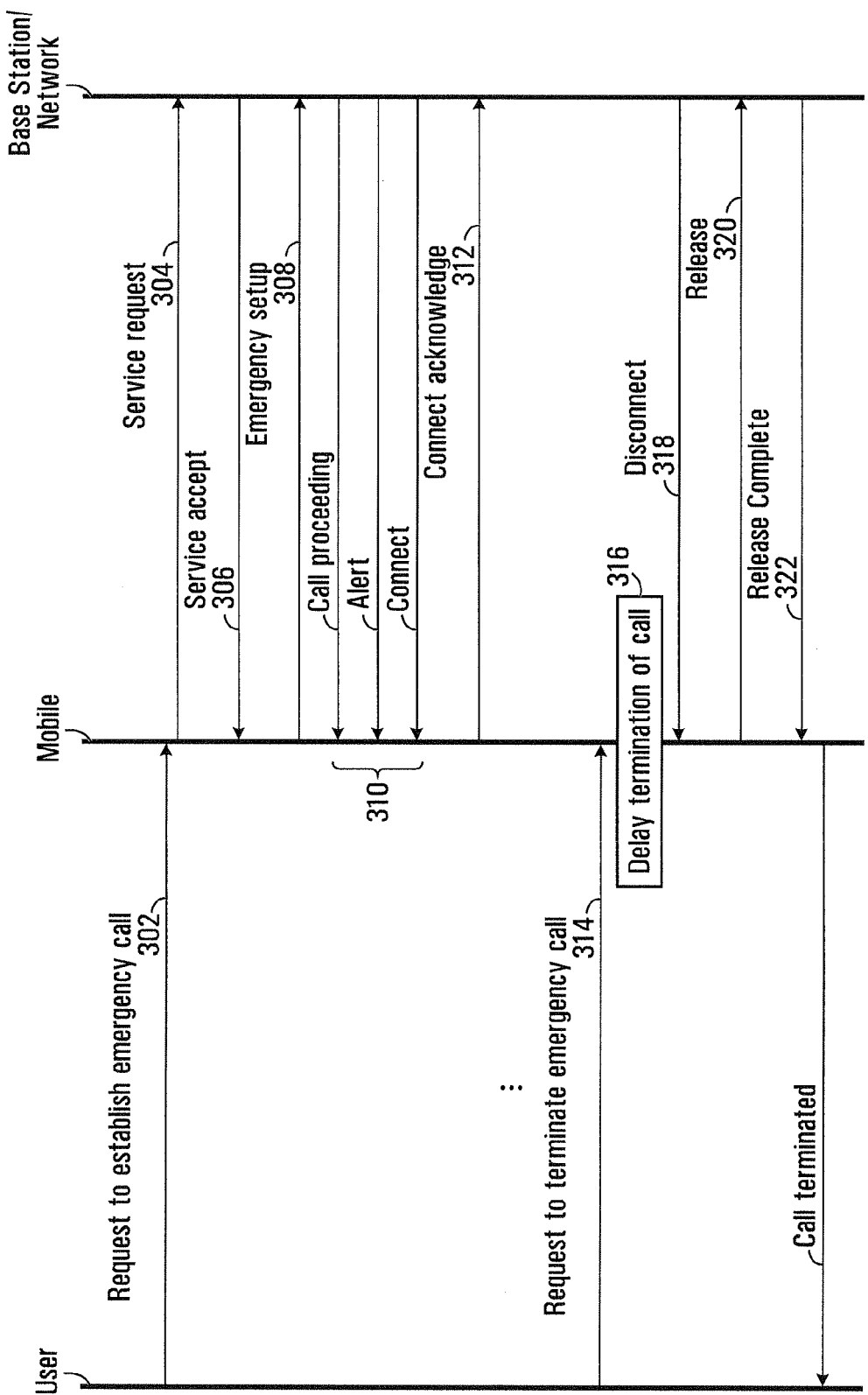
FIG. 5 is a flow diagram of an emergency call sequence.

The method of FIG. 5 is illustrated in the context of a specific sequence of operations in a GSM (Global System for Mobile Communications) network. It will be appreciated that in general the methods described with reference to FIGS. 4 and 5 can be implemented in a GSM network, but are not limited to GSM networks.

First, during operation 302, the mobile device 30 receives a request from the user via the user-interface 40 to establish an emergency call. For example, the user may use the keyboard 67 to dial '911'. During operation 304, the Emergency Communication Handler 44 controls the wireless access radio 62 to transmit a "Service Request" to the serving base station, for example, BTS 20A. During operation 306, the BTS 20A responds with a "Service Accept" message. During operation 308, the Emergency Communication Handler 44 controls the wireless access radio 62 to transmit an "Emergency Setup" message on an appropriate signaling channel. The BTS 20A forwards this special control message to the network to establish a voice connection with the local PSAP, for example, PSAP 52. During operation 310, the BTS 20A responds to the mobile device 30 by transmitting to the mobile device 30 a "Call Proceeding" message and an "Alerting" message as the attempt is being made to connect to the PSAP 52. A "Connect" message is transmitted from the BTS 20A to the mobile device 30 once the PSAP 52 has responded, for example, once an operator at the PSAP 52 picks up their phone to answer the call.

The Emergency Communication Handler 44 receives the "Connect" message, and during operation 312 controls the wireless access radio 62 to transmit a "Connect Acknowledge" message on the signaling channel. A voice connection has now been established between the mobile device 30 and the PSAP 52. The user can converse with the PSAP 52 on a dedicated voice channel.

During operation 314, the user makes a request via the user-interface 40 to terminate the emergency call. For example, the user may have realized they inadvertently made the emergency call, or the user may no longer think it is necessary to continue talking to the PSAP operator. However, during operation 316, the Emergency Communication Handler 44 delays terminating the call. Even if the user subsequently makes multiple requests to terminate the call, the Emergency Communication Handler 44 does not terminate the call.

After the PSAP operator is satisfied that the call should be terminated, the PSAP 52 terminates the call. This results in a "Disconnect" message being received by the mobile device 30 on the signaling channel during operation 318. The "Disconnect" message indicates that the PSAP 52 is terminating the emergency call. During operation 320, the Emergency Communication Handler 44 controls the wireless access radio 62 to transmit a "Release" message on the signaling channel, and during operation 322 a "Release Complete" message is received by the mobile device 30 on the signaling channel. The emergency call is now terminated.

Thus, in the method illustrated in FIG. 5, the Emergency Communication Handler 44 controls the mobile device 30 to delay termination of the emergency call until the recipient of the call (in this case the PSAP 52) terminates the call.

In an alternative embodiment, during operation 316 the Emergency Communication Handler 44 sends a message to the user-interface 40 requesting confirmation that the emergency call should be terminated, and if the user confirms that the call should be terminated, the Emergency Communication Handler 44 controls the mobile device 30 to terminate the call, even if the PSAP 52 has not terminated the call. In one such embodiment, if the user does not provide such confirmation within a predetermined period of time, the Emergency Communication Handler 44 automatically activates speakerphone (using speaker 68 and microphone 69) in an effort to gain the attention of the user.

In another alternative embodiment, during operation 316, the Emergency Communication Handler 44 provides a message to the user-interface 40 indicating that the call will not be terminated and additionally or instead activates speakerphone (using speaker 68 and microphone 69) just in case the user has moved the mobile device 30 away from his or her ear.

Figure 6:
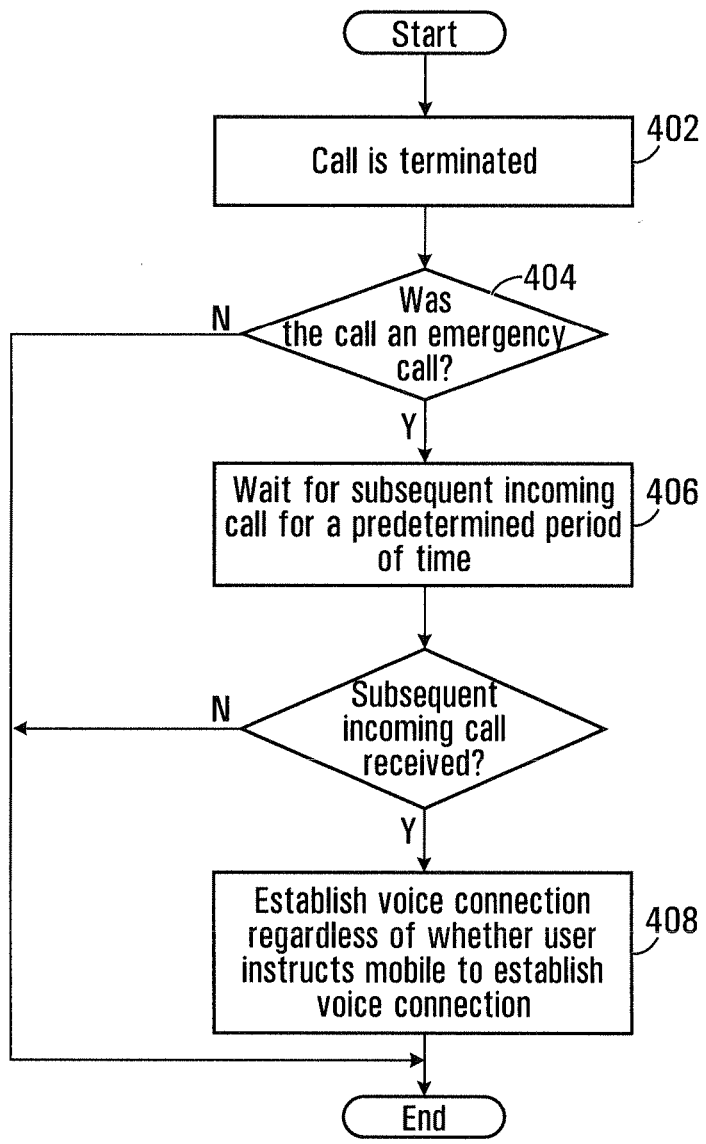
FIG. 6 is a flow diagram of another method for handling a call.

Turning now to FIG. 6, another method is provided for handling an emergency call. The method of FIG. 6 is also described with reference to the mobile device 30 shown in FIG. 3, but it will be appreciated that the method is not limited to such a device, and in fact, as explained later, is also applicable to electronic devices that are not mobile.

First in block 402, an ongoing call is terminated; i.e., the established voice connection between the user and the other party is terminated. For example, the user may press an "end" button on keyboard 67, or the mobile device 30 may receive a "Disconnect" message from the network indicating the other party is terminating the call. Next in block 404, the mobile device 30 determines whether the terminated call was an emergency call. If the call was not an emergency call, the method ends. If the call was an emergency call, then in block 406 the mobile device 30 waits for a subsequent incoming call for a predetermined period of time. The predetermined period of time may be, for example, five minutes. If no subsequent incoming call is received during the predetermined period, the method ends. However, if a subsequent incoming call is received, the method proceeds to block 408. In block 408, the mobile device 30 automatically establishes a voice connection with the incoming caller regardless of whether an input is received at the user-interface 40 instructing the mobile device 30 to establish the voice connection.

Therefore, upon termination of an emergency call, if a subsequent incoming call is received within a predetermined period of time (for example, if the PSAP or a related authority attempts to call back), the call will be automatically answered (i.e. the voice connection will be established), even if the user does not instruct the mobile device to answer the call. In this embodiment, the mobile device 30 automatically establishes a voice connection with any incoming caller in block 408 because in many current implementations it is not possible for the mobile device 30 to know whether or not the incoming call is from the PSAP. In alternative embodiments described later, the incoming call request can include an identifier identifying the incoming caller as an emergency operator (such as a PSAP) or a related authority, and the mobile device 30 can use this information to determine whether or not to automatically answer the incoming call.

In one embodiment, establishing the voice connection includes activating the speakerphone (e.g. using speaker 68 and microphone 69). Advantageously, in this embodiment, the incoming caller may be more easily able to hear the surrounding environment and/or attract the attention of the user, for example, if the user has put down the mobile device 30 subsequent to terminating the emergency call.

The Emergency Communication Handler 44 is configured to control the operations described above. For example, it is the Emergency Communication Handler 44 that controls the mobile device 30 to perform the operations in blocks 406 and 408 of the method of FIG. 6.

Figure 7:
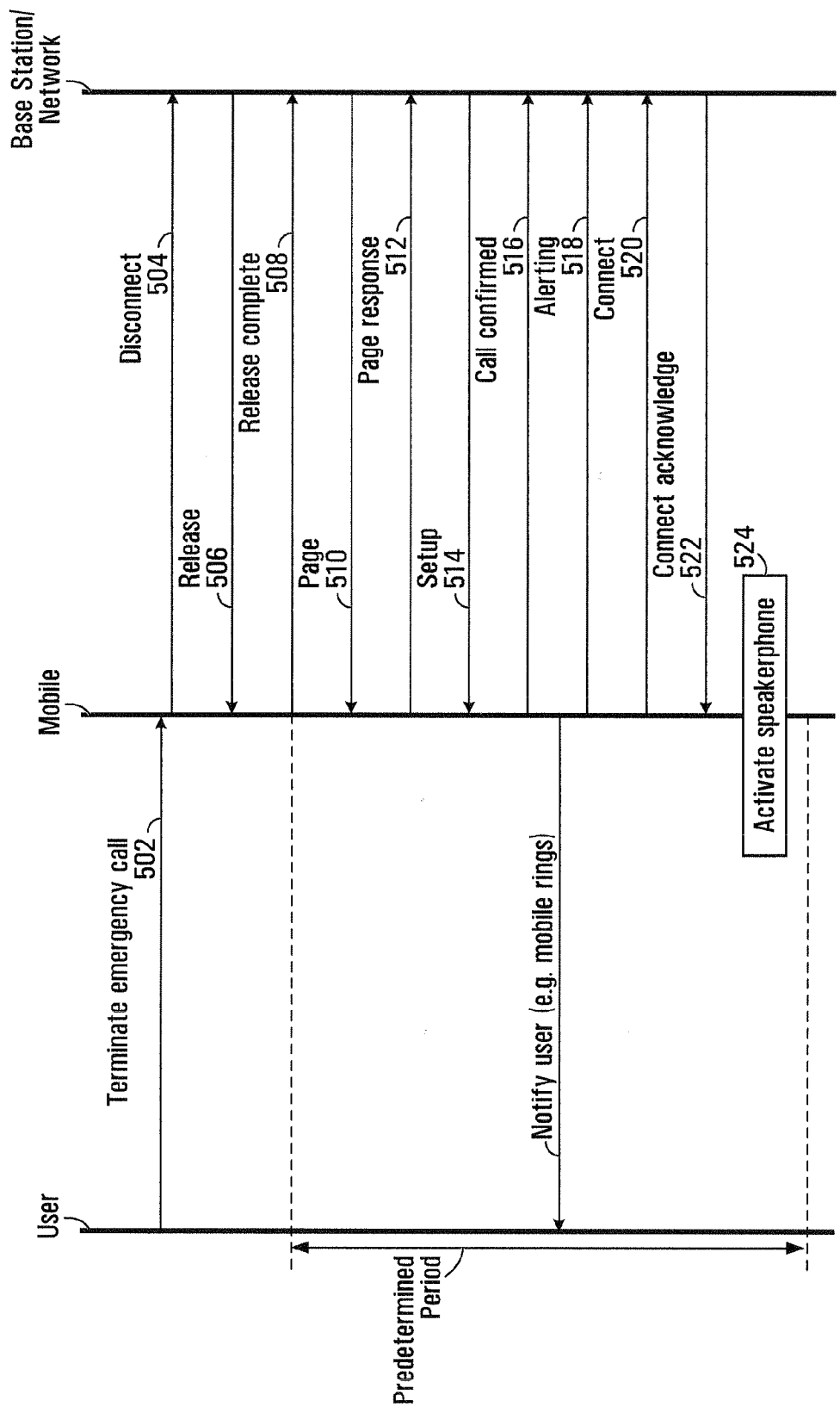
FIG. 7 is a flow diagram of an incoming call sequence subsequent to an emergency call.

Turning now to FIG. 7, another method is described with reference to the mobile device 30 shown in FIG. 3. However, it will be appreciated that the method is not limited to such a device.

The method of FIG. 7 is illustrated in the context of a specific sequence of operations in a GSM network. It will be appreciated that in general the methods described with reference to FIGS. 6 and 7 can be implemented in a GSM network, but are not limited to GSM networks.

First, during operation 502, the mobile device 30 receives a request from the user via the user-interface 40 to terminate an emergency call. For example, the user may press an "end" button on keyboard 67. During operation 504, the Emergency Communication Handler 44 controls the wireless access radio 62 to transmit a "Disconnect" message on a signaling channel to the serving base station, for example, BTS 20A. During operation 506, the BTS 20A responds with a "Release" message. During operation 508, the Emergency Communication Handler 44 controls the wireless access radio 62 to transmit a "Release Complete" message on the signaling channel. The emergency call has now been terminated.

The mobile device 30 then waits a predetermined period of time and during this time remains in an idle state, but periodically wakes up to listen for pages on the paging channel. If the predetermined period of time passes without a subsequent incoming call, the method ends. However, in the flow sequence illustrated in FIG. 7, a page is received during the predetermined period of time. This is shown during operation 510. During operation 512, the Emergency Communication Handler 44 controls the wireless access radio 62 to transmit a "paging response" message. In response, during operation 514, the BTS 20A sends to the mobile device 30 a "Setup" message. The "Setup" message requests the setup of a call with an incoming caller and typically includes information such as the phone number of the incoming caller. During operation 516, the Emergency Communication Handler 44 controls the wireless access radio 62 to transmit a "Call Confirmed" message. During operation 518, the Emergency Communication Handler 44 then notifies the user via user-interface 40 of an incoming call, for example, by causing the device 30 to ring. Meanwhile, the Emergency Communication Handler 44 controls the wireless access radio 62 to transmit an "Alerting" message to the BTS 20A on the signaling channel.

Either immediately after transmitting the "Alerting" message, or after a predetermined period of time (e.g. after a few rings), during operation 520 the Emergency Communication Handler 44 controls the wireless access radio 62 to transmit a "Connect" message to the BTS 20A on the signaling channel, regardless of whether the user has instructed the mobile device 30 to establish the voice connection (i.e. regardless of whether the user has "answered" the mobile device 30). During operation 522, the BTS 20A transmits a "Connect Acknowledge" message to the mobile device 30. A dedicated voice channel is now set up and the voice connection between the mobile device 30 and the incoming caller has been established. Optionally, during operation 524, the mobile device 30 activates speakerphone to increase the probability of the user hearing the incoming caller.

Thus, in the method illustrated in FIG. 7, the Emergency Communication Handler 44 controls the mobile device 30 to automatically establish a voice connection with a subsequent incoming caller regardless of whether the user instructs the device 30 to answer the call.

In the method illustrated in FIG. 7, the mobile device 30 initiates the termination of the emergency call during operations 502 and 504. It will be appreciated, however, that alternatively the PSAP could instead initiate termination of the emergency call. Additionally, in the method illustrated in FIG. 7, the Emergency Communication Handler 44 controls the mobile device 30 during operations 516 to 520 to establish the voice connection with any incoming caller. This is because in many current implementations it is not possible for the mobile device 30 to determine whether or not the incoming call is from an emergency operator or authority, such as a PSAP. In an alternative embodiment, the "Setup" message received during operation 514 includes an identifier identifying the call as originating from an emergency operator or authority (e.g. a PSAP). This identifier may be inserted into the "Setup" message by a component in the network, such as a MSC or a BTS. In one such embodiment, during operation 520 the Emergency Communication Handler 44 uses the identifier as a trigger to control the wireless access radio 62 to transmit a "Connect" message to the BTS 20A on the signaling channel, regardless of whether the user has instructed the mobile device 30 to establish the voice connection. In another such embodiment, during operation 520 the Emergency Communication Handler controls the wireless access radio 62 to transmit the "Connect" message regardless of whether the user has instructed the mobile device 30 to establish the voice connection if and only if the identifier is present in the "Setup" message. Otherwise, during operation 520 the Emergency Communication Handler 44 only controls the wireless access radio 62 to transmit the "Connect" message if an indication is received from the user at the user-interface 40 to establish the voice connection. In yet another such embodiment, the Emergency Communication Handler 44 uses the identifier in the setup message as a trigger to provide a message to the user-interface 40 indicating that the incoming call is from an emergency operator or authority. Therefore, the user is less surprised when the mobile device 30 automatically establishes the voice connection without the user requesting this.

It will be appreciated that providing an identifier in the "Setup" message identifying the incoming call as a call from an emergency operator or authority (e.g. a PSAP) is not limited to embodiments such as those illustrated in FIG. 7. For example, even if the Emergency Communication Handler 44 is not configured to control the mobile device 30 to automatically establish the voice connection with the subsequent incoming caller, the Emergency Communication Handler 44 can still use the identifier in the setup message as a trigger to provide a message to the user-interface 40 indicating that the incoming call is an emergency and/or is from an emergency operator or authority. This may motivate the user to answer the call rather than ignore it.

Figure 8:
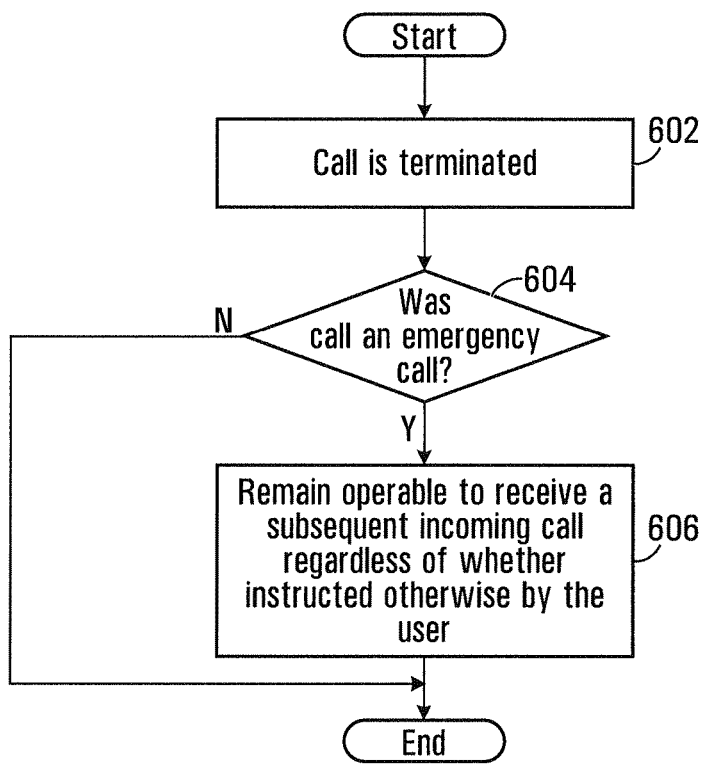
FIG. 8 is a flow diagram of yet another method for handling a call.

Turning now to FIG. 8, another method is provided for handling an emergency call. The method of FIG. 8 is also described with reference to the mobile device 30 shown in FIG. 3, but it will be appreciated that the method is not limited to such a device.

First in block 602, an ongoing call is terminated; i.e., the established voice connection between the user and the other party is terminated. For example, the user may press an "end" button on keyboard 67, or the mobile device 30 may receive a "Disconnect" message from the network indicating the other party is terminating the call. Next in block 604, the mobile device 30 determines whether the terminated call was an emergency call. If the call was not an emergency call, the method ends. If the call was an emergency call, the method proceeds to block 606. In block 606, the mobile device 30 remains operable to receive a subsequent incoming call regardless of whether an input is received at the user-interface 40 instructing otherwise. For example, if the user instructs the mobile device to power-down, or instructs the wireless access radio 62 to power-down, the mobile device 30 will not perform the instructed function, but will instead remain operable to receive a subsequent incoming call.

Therefore, upon termination of an emergency call, if the PSAP or a related authority attempts to call back, the mobile device 30 will be operable to receive the call. An example of a technique for remaining operable to receive a subsequent incoming call is maintaining the wireless access radio in a power-on state, which naturally includes maintaining the mobile device 30 itself in a power-on state. It will be appreciated, of course, that there may be situations in which the device 30 remains operable to receive a subsequent incoming call, but cannot receive the subsequent incoming call, for example, if the mobile device 30 is transported into an area in which there is no network connection.

In one embodiment, the mobile device 30 remains in block 606 for a predetermined period of time for example, a length of time loaded into memory during manufacture of the mobile device 30, a length of time configured by the user or a host server, or a length of time stored on a Universal Integrated Circuit Card (UICC) or another removable memory associated with the mobile device 30. In another embodiment, when in block 606, a message is provided to the user-interface 40 indicating that the mobile device 30 will automatically remain operable to receive incoming calls (for example, a message indicating "the device is in emergency call-back mode and will not power-down"). Therefore, a user is less likely to be confused if the user unsuccessfully tries to power-down the mobile device 30 or its wireless access radio 62. In one such embodiment, the user is also provided with the option to override the operation of block 606. For example, a message can be provided at the user-interface 40 querying whether the user wishes to configure the mobile device 30 to no longer be operable to receive incoming calls. Depending on the response of the user, the mobile device 30 can terminate the operation of block 606.

The Emergency Communication Handler 44 is configured to control the operations described above. For example, it is the Emergency Communication Handler 44 that controls the mobile device 30 to perform the operations in block 606 of the method of FIG. 6. As another example, it is the Emergency Communication Handler 44 that controls the mobile device 30 to remain operable specifically for the predetermined period of time, to display a message indicating that the mobile device 30 will automatically remain operable to receive incoming calls, and/or to provide the user with the option to override the operation of block 606.

Figure 9:
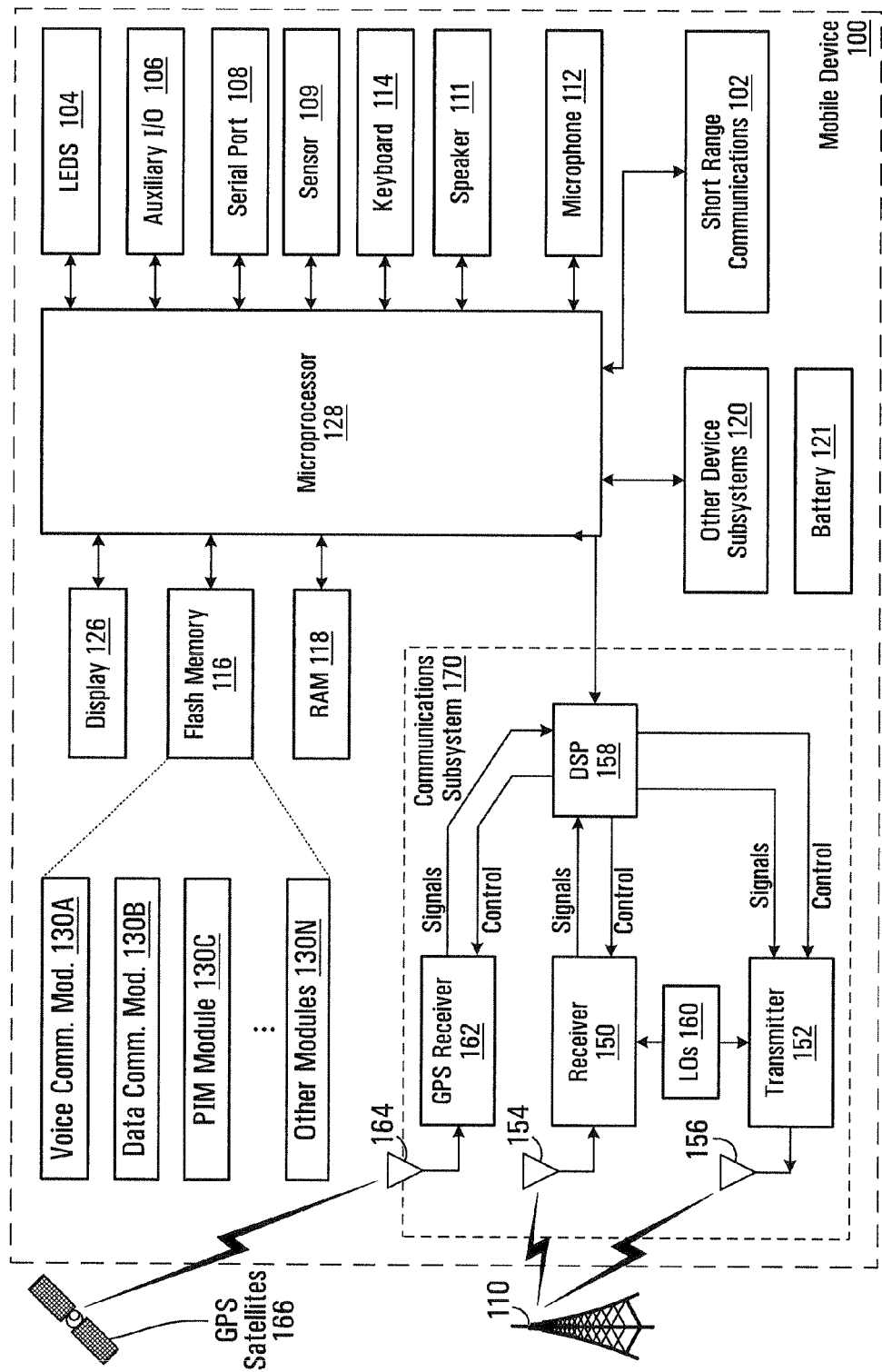
FIG. 9 is an embodiment of a mobile device that may be used to implement some embodiments of the present application.

Referring now to FIG. 9, a block diagram is shown of an embodiment of another mobile device 100 that may implement any of the device methods described herein. The mobile device 100 is shown with specific components for implementing features similar to those of the mobile device shown in FIGS. 1-3. It is to be understood that the mobile device 100 is shown with very specific details for exemplary purposes only.

The mobile device 100 has a housing that may be elongated vertically, or may take on other sizes and shapes (including clamshell housing structures). The keyboard 114 may include a mode selection key, or other hardware or software for switching between text entry and telephony entry. Alternatively, the mobile device 100 may have a housing that does not take on other sizes and shapes.

A microprocessor 128 is shown schematically as coupled between a keyboard 114 and a display 126. The microprocessor 128 controls operation of the display 126, as well as overall operation of the mobile device 100, in response to actuation of keys on the keyboard 114 by a user.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The keyboard 114, speaker 111, microphone 112, display 126, and LEDs 104 are part of the user-interface.

The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system.

Additional software modules, illustrated as another software module 130N, may be installed during manufacture. The software modules may, for example, include one or more modules that control the execution of the methods described with reference to FIGS. 4 to 8, or implement the Emergency Communication Handler 44.

It will be appreciated that the implementations described with reference to FIG. 9 are very specific for exemplary purposes. For example, alternative implementations are possible in which the methods described with reference to FIGS. 4 to 8 are not implemented as software and stored on the flash memory 116. More generally, the methods described with reference to FIGS. 4 to 8 may be implemented as software running on appropriate hardware, firmware, or any appropriate combination thereof.

Communication functions, including data and voice communications, are performed through the communication subsystem 170, and possibly through the short-range communications subsystem 102. The communication subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (LOs) 160.

The specific design and implementation of the communication subsystem 170 is dependent upon the communication network in which the mobile device 100 is intended to operate. For example, the communication subsystem 170 of the mobile device 100 may be designed to operate with the Mobitex™ DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, (often referred to as a SIM card), in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are known in the art and are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

As an example, in the embodiments described with reference to FIG. 9, the communications subsystem 170 can perform functionality equivalent to the wireless access radio 62 of FIG. 3; the keyboard 114, speaker 111, microphone 112, display 126, and LEDs 104 are part of a user-interface that can perform functionality equivalent to the user-interface 40 of FIG. 3; and the other modules 130N in FIG. 9 can implement functionality equivalent to the Emergency Communication Handler 44 of FIG. 3.

The methods illustrated above in FIGS. 4 to 8 are described in the context of a mobile device. However, it will be appreciated that many of the methods described above are also equally applicable to conventional stationary telephones (such as a desktop telephone or a home telephone), to computers implementing a virtual telephone service through the Internet, or to telephones and mobile phones in a mobile voice system in which a single number is associated with both a desktop telephone and its associated mobile device. As one example, the methods of FIGS. 4 and 6 can be implemented in any such device or system.

Moreover, it will be appreciated that having regard to this disclosure it is straightforward to combine many of the methods described above in order to provide enhanced functionality. For example, the method of FIG. 4 can be combined with the method of FIG. 6 or 8. As another example, block 606 in the method of FIG. 8 can be combined with block 406 in the method of FIG. 6.

Although the foregoing has been described with reference to certain specific embodiments, various modifications thereof will be apparent to those skilled in the art without departing from the scope of the claims appended hereto.

The invention claimed is:

1. A method for handling a call in an electronic device comprising:
   upon receipt of a request at a user-interface of the electronic device to terminate the call:
   when the call is an emergency call, then (i) the electronic device requesting confirmation that the call should be terminated, and (ii) when the confirmation is not received at the electronic device within a predetermined period of time, then the electronic device automatically activating a speakerphone of the electronic device.

2. The method of claim 1 further comprising, if the call is an emergency call, the electronic device delaying termination of the call, and wherein said requesting confirmation that the call should be terminated comprises providing a message to the user-interface, the message requesting confirmation that the call should be terminated.

3. The method of claim 1 further comprising, if the call is an emergency call, the electronic device delaying termination of the call until a message is received by the electronic device indicating that the call is terminated by a recipient of the call.

4. The method of claim 3 wherein said message is a disconnect message received on a signaling channel.

5. The method of claim 2 wherein the message requesting confirmation that the call should be terminated comprises a message querying whether the call was made inadvertently; the method further comprising:
   receiving at the user-interface an indication that the call was made inadvertently and in response the electronic device performing at least one of:
   (i) automatically generating a message for notifying a recipient of the call that the call was made inadvertently; and
   (ii) providing a message to the user-interface comprising instructions that instruct a user to communicate with a recipient of the call to specify that the call was made inadvertently.

6. The method of claim 1 further comprising:
   if the call is an emergency call, upon the call being terminated and if an incoming call request is subsequently received by the electronic device within a predetermined period of time, establishing a voice connection regardless of whether an input is received at the user-interface instructing the electronic device to establish the voice connection.

7. The method of claim 1 further comprising:
   if the call is an emergency call, upon the call being terminated, the electronic device remaining operable to receive a subsequent incoming call regardless of whether an input is received at the user-interface instructing otherwise.

8. An electronic device for handling a call, the device comprising:
   a user-interface;
   a speakerphone;
   an emergency communication handler for, when the call is an emergency call, upon receipt of a request at the user-interface to terminate the call, then (i) requesting confirmation that the call should be terminated, and (ii) when the confirmation is not received at the user-interface within a predetermined period of time, then the emergency communication handler automatically causing activation of the speakerphone.

9. The electronic device of claim 8, the emergency communication handler further configured for, if the call is an emergency call, delaying termination of the call; and wherein said requesting confirmation that the call should be terminated comprises providing a message to the user-interface, the message requesting confirmation that the call should be terminated.

10. The electronic device of claim 9, wherein said delaying termination of the call occurs while waiting for receipt of the confirmation.

11. The electronic device of claim 8, the emergency communication handler further configured for, if the call is an emergency call, delaying termination of the call until a message is received by the electronic device indicating that the call is terminated by a recipient of the call.

12. The electronic device of claim 11 wherein said message is a disconnect message received on a signaling channel.

13. The electronic device of claim 9 wherein the message requesting confirmation that the call should be terminated comprises a message querying whether the call was made inadvertently;
   and wherein upon receiving at the user-interface an indication that the call was made inadvertently, the emergency communication handler is further configured to perform at least one of:
   (i) automatically generating a message for notifying a recipient of the call that the call was made inadvertently; and
   (ii) providing a message to the user-interface comprising instructions that instruct a user to communicate with a recipient of the call to specify that the call was made inadvertently.

14. The electronic device of claim 8 wherein the emergency communication handler is further configured for: if the call is an emergency call, upon the call being terminated and if an incoming call request is subsequently received by the electronic device within a predetermined period of time, establishing a voice connection regardless of whether an input is received at the user-interface instructing the electronic device to establish the voice connection.

15. The electronic device of claim 8 wherein the emergency communication handler is further configured for: if the call is an emergency call, upon the call being terminated, controlling the electronic device to remain operable to receive a subsequent incoming call regardless of whether an input is received at the user-interface instructing otherwise.

16. A non-transitory computer-readable medium having stored thereon computer-readable instructions for handling a call in an electronic device, the computer-readable instructions including instructions for performing operations comprising:
   upon receipt of a request at a user-interface of the electronic device to terminate the call:
   when the call is an emergency call, then (i) the electronic device requesting confirmation that the call should be terminated, and (ii) when the confirmation is not received at the electronic device within a predetermined period of time, then the electronic device automatically activating a speakerphone of the electronic device.

17. The non-transitory computer-readable medium of claim 16, wherein the non-transitory computer-readable medium is a magnetic cassette, or a magnetic tape, or a magnetic storage device, or an optical storage device, or a CD-ROM, or a digital versatile disk (DVD), or RAM, or ROM, or EEPROM, or flash memory.

18. The non-transitory computer-readable medium of claim 16, the computer-readable instructions further including instructions for performing the operation of: if the call is an emergency call, the electronic device delaying termination of the call; and wherein said requesting confirmation that the call should be terminated comprises providing a message to the user-interface, the message requesting confirmation that the call should be terminated.

19. The non-transitory computer-readable medium of claim 16, the computer-readable instructions further including instructions for performing the operation of: if the call is an emergency call, the electronic device delaying termination of the call until a message is received by the electronic device indicating that the call is terminated by a recipient of the call, wherein said message is a disconnect message received on a signaling channel.

20. The non-transitory computer-readable medium of claim 18 wherein the message requesting confirmation that the call should be terminated comprises a message querying whether the call was made inadvertently; the computer-readable instructions further including instructions for performing the operation of:
  receiving at the user-interface an indication that the call was made inadvertently and in response the electronic device performing at least one of:
  (i) automatically generating a message for notifying a recipient of the call that the call was made inadvertently; and
  (ii) providing a message to the user-interface comprising instructions that instruct a user to communicate with a recipient of the call to specify that the call was made inadvertently.

21. The non-transitory computer-readable medium of claim 16, the computer-readable instructions further including instructions for performing the operation of: if the call is an emergency call, upon the call being terminated and if an incoming call request is subsequently received by the electronic device within a predetermined period of time, establishing a voice connection regardless of whether an input is received at the user-interface instructing the electronic device to establish the voice connection.

22. The non-transitory computer-readable medium of claim 16, the computer-readable instructions further including instructions for performing the operation of: if the call is an emergency call, upon the call being terminated, the electronic device remaining operable to receive a subsequent incoming call regardless of whether an input is received at the user-interface instructing otherwise.

\* \* \* \* \*